8721X
N. & P. Crosby,
Reciprocating Saw Mill.
Patented Mar. 27, 1835.
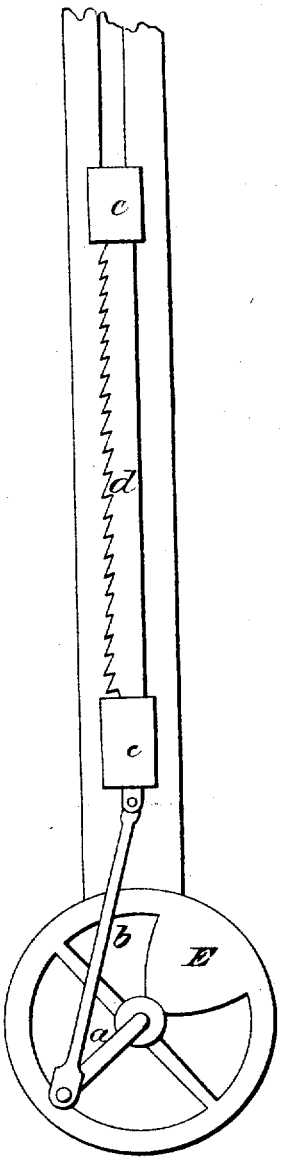
A.M. PHOTO-LITHO. CO. N.Y. (OSBORNE'S PROCESS)

8721X March 27. 1835 21

Nathaniel & Pearson Crosby of Pomfret New York

Letters Patent,

The schedule referred to in these Letters Patent and making part of the same containing a description in the words of the said Nathaniel Crosby and Pearson Crosby themselves of their improvement in the construction of Saw Mills.

To all to whom these presents shall come Be it Known that We Nathaniel Crosby and Pearson Crosby of Pomfret in the County of Chatauqua and in the State of New York have invented constructed and applied to use a new and useful improvement in the construction of Saw Mills and that the following is a full and exact description thereof, that is to say. The Invention and improvement claimed by the subscribers, is a balance wheel or a segment of a wheel or weight made of cast iron or some other suitable material of sufficient weight, and attached to the crank shaft, or water wheel of a common Saw Mill in such as manner as nearly to counterbalance the crank, pitman Saw Gate and other superincumbent weight and thereby overcome and equalize the jerking and irregular motion of the crank.

This wheel may be overhung on the outside of the plumb Block and so made as to form the crank, or it may be affixed to the shaft on the inside of the plumb block, or if a segment of a wheel or weight it may be attached to any part of the shaft or water wheel opposite to the crank so that it nearly counterbalances the saw crank pitman & saw gate, and other weight as aforesaid — In testimony that the above is a true specification of our said Invention and improvement as above described we have hereunto set our hands the twelfth day of March in the year eighteen hundred and thirty five Witnesses { Jas Mullet
B. Walworth }

Nathaniel Crosby
Pearson Crosby (Patented 27 March 1835)

Drawings made